United States Patent [19]
Adam et al.

[11] Patent Number: 5,438,332
[45] Date of Patent: Aug. 1, 1995

[54] METHOD OF HARDENING TRANSMISSIONS, IN PARTICULAR BETWEEN A CONTROL STATION AND A TRANSPONDER, AND A DEVICE IMPLEMENTING THE METHOD

[75] Inventors: Daniel Adam, Vitry S/Seine; André Bech, Vernouillet; Alain Desmoucelles, Savigny Sur Orge; Denis Vallier, Verrieres Le Buisson, all of France

[73] Assignee: Thomson-CSF, Puteaux, France

[21] Appl. No.: 266,788

[22] Filed: Jun. 28, 1994

Related U.S. Application Data

[63] Continuation of Ser. No. 22,269, Feb. 25, 1993, abandoned.

[30] Foreign Application Priority Data

Feb. 28, 1992 [JP] Japan .................... 4-02362

[51] Int. Cl.$^6$ .............................. G01S 13/79
[52] U.S. Cl. ........................ 342/45; 342/98; 342/18
[58] Field of Search .......... 342/45, 60, 98, 17, 342/18, 19

[56] References Cited

U.S. PATENT DOCUMENTS

| | | | |
|---|---|---|---|
| 3,947,845 | 3/1976 | Lyon | 342/30 |
| 4,066,964 | 1/1978 | Costanza et al. | 375/38 |
| 4,074,263 | 2/1978 | Sullivan, Jr. | 342/45 |
| 4,438,435 | 3/1984 | Hofgen et al. | 342/47 |
| 4,494,073 | 1/1985 | Sorgi | 328/14 |
| 4,566,009 | 1/1986 | Hanni et al. | 342/45 |
| 4,586,047 | 4/1986 | Inacker et al. | 342/373 |
| 4,607,375 | 8/1986 | Lee | 455/27 X |
| 4,715,046 | 12/1987 | True, III et al. | 375/61 |
| 4,837,575 | 6/1989 | Conner, Jr. | 342/45 |
| 4,862,176 | 8/1989 | Voles | 342/45 |
| 4,933,914 | 6/1990 | Feintuch et al. | 367/87 |
| 5,019,825 | 5/1991 | McCorkle | 342/201 |
| 5,101,208 | 3/1992 | Parker et al. | 342/45 |
| 5,124,699 | 6/1992 | Tervoert et al. | 342/44 X |
| 5,126,746 | 6/1992 | Gritton | 342/125 |
| 5,233,545 | 8/1993 | Ho et al. | 364/569 |

FOREIGN PATENT DOCUMENTS

| | | |
|---|---|---|
| 3415032 | 11/1984 | European Pat. Off. |
| 0182762 | 5/1986 | European Pat. Off. |
| 0247790 | 12/1987 | European Pat. Off. |
| 2068688 | 8/1981 | United Kingdom |

*Primary Examiner*—John B. Sotomayor
*Attorney, Agent, or Firm*—Oblon, Spivak, McClelland, Maier, & Neustadt

[57] ABSTRACT

To harden transmissions, in both directions, between a master station (1) and a slave station (2), a table of communication parameter values is memorized in each station and the table values are then used in accordance with the master station's decision. Each message from one station to the other contains information to allow the receiving station to determine the parameter values to be selected in the table to eliminate values where there is a high risk of jamming.

44 Claims, 2 Drawing Sheets

METHOD OF HARDENING TRANSMISSIONS, IN PARTICULAR BETWEEN A CONTROL STATION AND A TRANSPONDER, AND A DEVICE IMPLEMENTING THE METHOD

This application is a Continuation of application Ser. No. 08/022,269, filed on Feb. 25, 1993, now abandoned.

BACKGROUND OF THE INVENTION

The invention is a method of hardening transmissions in both directions, particularly between a control station and a transponder, and a device to implement this method. Telecommunications, particularly between a control station and a transponder, for example between a remote control station and a missile, can be jammed either intentionally or unintentionally. Intentional jamming is done by specially designed jamming stations. Unintentional jamming can be caused either by other telecommunications, particularly those using frequencies close to those used for the transmissions in question (for example, communications between other nearby remote control stations and their own missiles) or by various conditions such as hardware failures, interference generated by atmospheric conditions, etc. It is essential to eliminate all the effects of jamming, particularly in missile telecommunications when flight times are relatively short and error-free data exchange is essential.

STATE OF THE PRIOR ART

French patent 2 639 102 describes a missile guidance device in which a frequency table is loaded into the missile transponder and read synchronously with an identical table in the guidance station. Because the frequencies are arranged in random sequences in these tables and because the missile flight time is short, it is virtually impossible for a surveillance and jamming station to determine the next frequency by analyzing previous frequencies and, therefore, virtually impossible to jam all frequencies and/or inject false data. However, it is possible to jam a few frequency bands in which it it highly probable that some of the frequencies from the said tables lie. Moreover, the data exchanges between the ground station and the missile transponder are not protected against unintentional jamming and the known method does not allow the table of frequencies to be modified in flight so that, in the worst case, particularly in the case of short-range missiles, most of the data exchanged can be jammed.

German patent application 3 415 032 describes a telecommunications system in which the carrier frequency varies pseudo-randomly. The receiving station monitors the transmission quality and, as soon a certain level of interference is exceeded on a given frequency, switches to a new frequency outside the previous band. However, the application does not cover, or suggest a method of covering, the case where the receiving station is no longer capable of communicating with the operating station because the frequency used is excessively jammed. Moreover, if all usable frequencies in the frequency band provided became jammed, it would be necessary to use a large number of back-up frequencies outside the planned band; this would imply at least doubling the initially planned band width, which is virtually impossible when the initial band is already very wide and, as is generally the case, represents the maximum passband of the transmission and reception circuits.

SUMMARY OF THE INVENTION

The method according to the invention ensures data will be transmitted without loss, as quickly as possible, particularly when the remote control station and/or the transponder detects and analyses strong jamming, whether intentional or not, of a large number of frequencies or a wide frequency band; the invention is also a device, which is simple to install in existing systems, to implement this method.

The method according to the invention of hardening pulsed transmissions by frequency hopping in both directions between a "master" station and at least one "slave" station or transponder involves memorizing at least one table of communication parameters in each station and then changing the parameters that describe the pulses transmitted by exchanging data between the master and slave stations. The change may be instigated either by the master or the slave station. In the event of persistent jamming and/or intrusion on certain frequencies, the frequencies affected are inhibited.

BRIEF DESCRIPTION OF THE DRAWINGS

The invention will be better understood upon reading the detailed description of two embodiments, given as non-exhaustive examples, referring to the appended figures of which.

DESCRIPTION OF THE PREFERRED EMBODIMENTS

A missile firing station is used as an example to describe the invention but the invention is, obviously, not limited to such an application but can be used in a large number of telecommunications systems such as satellite telecommunications systems, space probe control systems, inter-vehicle links, etc. where communications jamming, whether intentional or not, and/or intrusion can be a problem.

Figure 1:
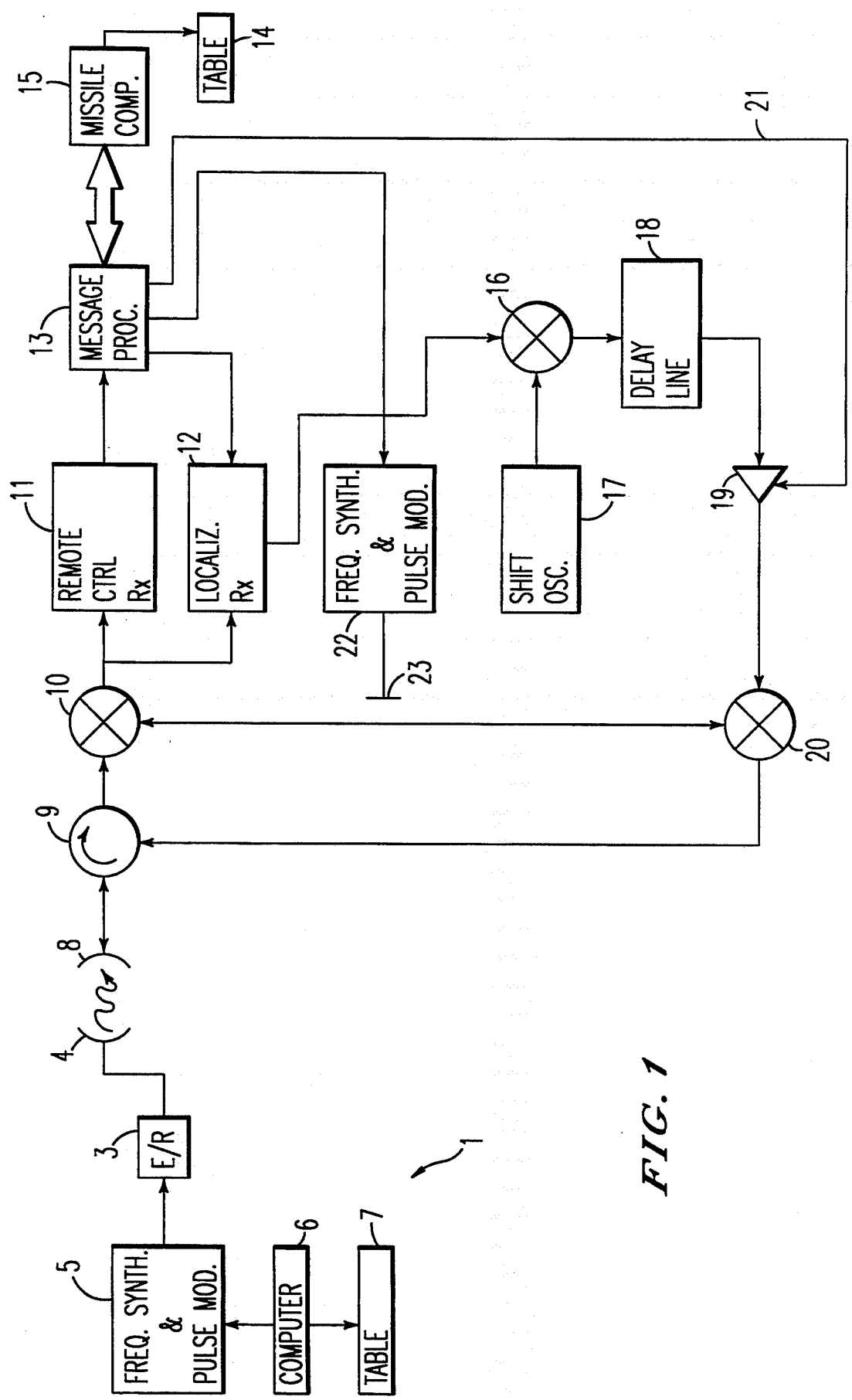
FIG. 1 is a simplified block diagram of a master station and a slave station according to the invention.

FIG. 1 shows a "master" station 1 and a "slave" station 2. Station 1 is, for example, a ground control station and station 2 is, for example, a missile guided by station 1. Obviously, in other applications, the roles of the master station and slave station(s) can be changed during an exchange session or after a certain number of such sessions.

Station 1 basically comprises a transceiver device 3 with its transceiving antenna 4. However, obviously, the transmitter, receiver, transmission antenna and reception antenna can all be separate components. Transceiver 3 is connected to a frequency synthesizer and pulse modulation circuit 5. The modulator may control the number of pulses transmitted and/or the pulse width and/or the pulse timing. Transceiver 3 is also connected to a computer 6, itself connected to circuit 5 and a table of frequencies 7. Items 6 and 7 are represented separately but, obviously, table 7 can be built into computer 6.

"Slave" station 2 comprises a transceiving antenna 8 connected to a switching device 9 which, in the present case (operation at microwave frequencies) is a circulator. The reception output channel from device 9 is connected to a mixer 10 and includes a remote control receiver 11 and a localization receiver 12. The output from receiver 11 is connected to a message processor 13, itself connected to a table of frequencies 14 and the station 2 central computer 15. Receiver 12 is connected to table 14 and the input to mixer 16. The other input to mixer 1.6 is connected to a shift oscillator 17 and its output is connected, via delay line 18, to a transmission amplifier 19. The output from amplifier 19 is connected to the antenna 8 via a mixer 20 and a circulator 9. Processor 13 controls the gain of amplifier 19 via line 21. Processor 13 is also connected to a frequency synthesizer and pulse modulator 22, this modulator being coupled to mixers 10 and 20 via coupler 23.

Frequency tables 7 and 14 each contain a large number, for example several hundred, values of transmission parameters (applicable to the carrier frequency and the characteristics of the pulses transmitted), these values preferably being coded and the frequencies lying in the frequency band used for transmission between stations 1 and 2. These tables also contain various combinations of pulse widths and/or numbers and/or timing values. In the remainder of the description, the term "transmission parameters" covers all these various frequency values and combinations of pulse characteristics. The frequency values can advantageously be grouped into blocks of frequency values of a similar magnitude, for example low, medium and high values. If, for example, the frequencies in the block of high values are systematically jammed, it is then possible for station 1 to inhibit the use of this block. According to the invention, to further reinforce the anti-jamming and anti-intrusion performance, the parameters that describe the characteristics of pulses transmitted are also varied. These parameters can be changed after transmitting each packet of pulses or after each pulse. Tables 14 are, for example, memorized shortly before launching the missiles. However, these tables can also be downloaded during the flight. Tables 7 can either be "frozen" or contain a series of values selected by the program as desired by the station 1 operator. Table 7 contains at least the same data as table 14.

Figure 2A:
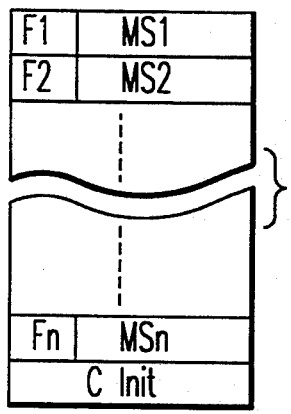
FIGS. 2 and 3 represent two methods of compiling a table of values to implement the method according to the invention.
Figure 2B:
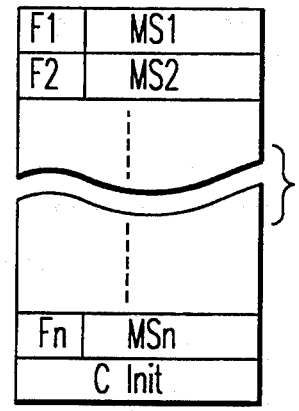

In one embodiment of the invention, station 1 explicitly transmits absolute values of the parameters or variations in their value and the said tables then each contain these values. As shown in FIG. 2, tables 7 and 14 contain frequencies F1 to Fn in the same sequence and at the same addresses. A parameter value and an appropriate synchronization or correlation word MS1 to MSn is memorized at each address. Initial condition data Cinit containing, in particular, data on the transmission mode, the timing and order data is memorized at a certain address in each table.

Figure 3A:
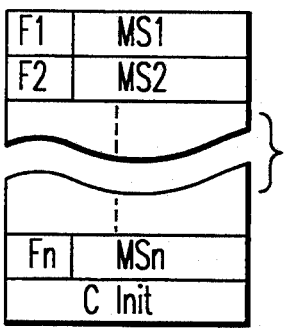
Figure 3B:
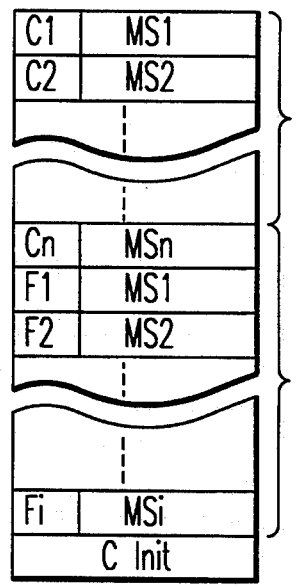

In another embodiment of the invention, schematically represented in FIG. 3, station 1 transmits coded absolute values of parameters or variations in parameters using, for example, a compressed code. In this case, table 7 in station 1 contains these codes C1 to Cn, while table 14 contains, firstly, in section S1, the same codes and, secondly, in section S2, the corresponding decoded values of parameters F1 to Fi (there is not necessarily the same number of parameters as codes). Tables 7 and 14 also contain, at each address and in addition to the codes and parameter values, the corresponding synchronization words MS1 to MSn and MS1 to MSi respectively. In station 1, computer 6 determines, either controlled by its program or following an action by the station operator, the communication parameter(s) Fc to be used at a given later instant and transmits its coded value Ci, determined from table 7, to station 2. In station 2, processor 13 reads this coded value Ci in S1 in table 14; coded value Ci refers to the corresponding address in S2 and this address contains the required value of each parameter.

If the tables of values are read in sequence, station 1 fixes an arbitrary start point when the system is initialized, just before the missile is launched or at the instant it is launched, and immediately transmits this start point to station 2; tables 7 and 14 are then read synchronously.

If the tables of values are not read in sequence, station 1 fixes, at initialization, an initial frequency for data exchange and immediately tells station 2 the value, either coded using, for example, a compressed code or uncoded, of the next frequency or the next change in frequency and the characteristic of the next pulse(s). This procedure is then repeated as often as necessary. The transmission frequency can be changed very quickly, particularly following intentional jamming and/or a risk of intrusion, depending on the speed of the frequency synthesizers used. Tables 7 and 14 can contain a large number of combinations of number of pulses per packet, pulse widths and pulse timing values and large number of different frequency values, for example a few dozen to several hundred different values, separated (when considered in sequence) by a few tens of MHz to obtain operation in one of the bands containing frequencies, for example, between approximately 1 and 40 GHz. The range of frequencies thus covered (approximately 1 GHz or more), combined with careful choice of pulse characteristics, is generally sufficient to enable a few relatively unjammed frequencies to be found, even in a densely jammed environment, for communications between stations 1 and 2. If the reception conditions are found to be very bad on several of the frequencies selected, any messages or parts of messages not received, or poorly received, must be repeated, possibly returning to a frequency (or frequencies) where there is less interference and using other combinations of pulse characteristics.

Figure 4:
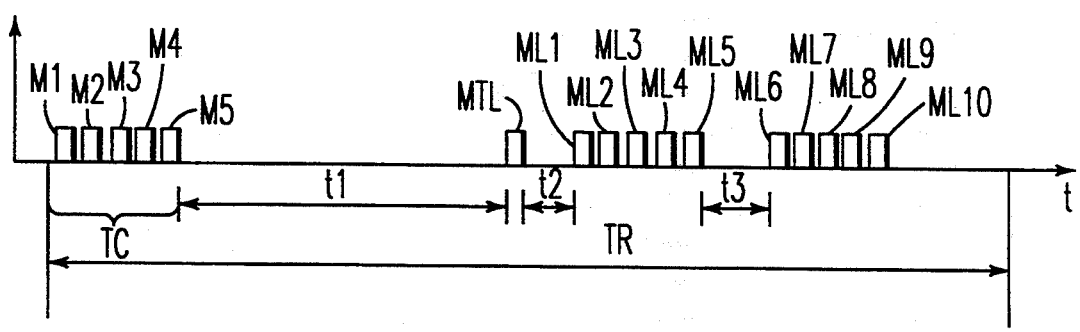
FIG. 4 is a simplified timing diagram of an example of a message that can be sent by the master station.

Referring to FIG. 4, we shall now describe an example of messages transmitted by station 1 to station 2 to guide a missile. The messages modulate a carrier using, for example, FSK modulation. Station 1 transmits these messages at regular or irregular intervals of between, for example, 20 and 50 ms if station 2 is part of a missile. Consequently, even a very fast missile (flying, for example, at Mach 3) will only cover a short distance (a few tens of meters) between two consecutive messages. Obviously, if required, the interval between consecutive messages can be reduced.

Each repetition TR of a message, as shown in FIG. 4, includes, at its beginning, a packet TC containing, for example, five words, designated M1 to M5 on FIG. 4. In one example of an embodiment, word M1 is a synchronization word, word M2 contains the missile address (station 1 may simultaneously manage several missiles) and an order-type code and words M3 to M5 each contain the values of the order or given orders. As soon as receiver 11 in station 2 receives word M1, used as a recognition code, it informs processor 13 which then sets time windows around the instants at which words M2 to M5 must be received; it ignores any data received outside these time windows.

Within the repetition period TR in question, at a time t1 (for example approximately 10 ms) after transmitting M5 which station 2 requires to process the orders received, station 1 transmits, at the same frequency as used to transmit word packet TC, a (or several if necessary) remote control word MTL indicating it is going to start a missile localization process at frequency Fj. At the end of time t2 (for example, approximately 0.5 to 1 ms) after transmitting MTL, station 1 transmits a packet containing, for example, five words ML1 to ML5 at frequency Fi. Localization receiver 12 processes each word ML1 to MLS, inserting, in a way known to the prior art, its own data and transmits them to mixer 16. At output from mixer 16, the carrier frequency for these words is shifted by a value determined by oscillator 17 (for example a few tens of MHz), delayed by delay line 18, amplified in 19, mixed in 20 and then retransmitted by antenna 8.

If the transmission of words ML1 to ML5 is strongly jammed, station 1 transmits, after time t3 (preferably equal to t2) and still within the same period TR, another packet of five words ML6 to ML10 similar to ML1 to ML5 but at a frequency Fk different to Fj. In the event of very severe jamming station 1 can even transmit other packets of five words during period TR and/or modify tile characteristics of the pulses which form the words.

In one embodiment of the invention, to increase the resistance to jamming and/or reduce the risk of intrusion, station 1 can change the word carrier frequency at each word instead of at each packet of words.

In another embodiment of the invention, if station 2 does not receive words ML1 to ML10, or only receives one or two of them due to very poor reception conditions, it sets to a standby frequency after a predetermined time and/or modifies other communication parameters (characteristics of the pulses). Receiving no replies to its localization signals, station 1 also sets to this standby frequency after the same predetermined time and/or changes the communication parameters in the same way.

If station 2 receives all words ML1 to ML5 and ML6 to ML10 except one, it still switches, after a normal time, to the next receiving frequency determined by station 1, which station 2 can calculate from data received since this data is redundant to avoid a delayed reaction due to the loss of only a small quantity of data.

The above description of the invention is based on the remote control of a missile but, obviously, when the invention is applied to other telecommunications systems, the type of signals exchanged can be different (for example, no remote control but only interrogation/reply signals), their composition (number of words and/or packets) can be different and the timing can be different (repetition rate, length of words, intervals between words and packets). The main characteristic common to all systems according to the invention is that they are capable of changing transmission parameters (frequency and/or pulse characteristics) when ordered by one of the system stations (and not necessarily the same station throughout tile same transmission session), all stations in the system being capable of memorizing tables of values (in explicit or coded form) to determine the various frequencies and/or pulse characteristics to be used to avoid jamming and/or intrusion.

What is claimed is:

1. A method for frequency hopping communication, comprising the steps of:

transmitting, a frequency hopping first signal which includes pulses, from a first station to a second station;

transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to a jamming of said first signal;

receiving the second signal by the second station using a second table in the second station which indicates how said at least one of the communication parameters has been changed.

2. A method according to claim 1, wherein said at least one of the communication parameters which has been changed is the pulse width.

3. A method according to claim 1, wherein said at least one of the communication parameters which has been changed is the number of pulses.

4. A method according to claim 1, wherein said at least one of the communication parameters which has been changed is the timing of the pulses.

5. A method according to claim 4, wherein the changing of the timing of the pulses includes a changing of at least one of a repetition rate, a word length, and intervals between words and packets.

6. A method according to claim 1, wherein the second station causes said at least one of the communication parameters to be changed.

7. A method according to claim 1, wherein when a frequency is jammed for a predetermined period of time, said first station is inhibited from transmitting on the frequency which has been jammed.

8. A method according to claim 1, wherein after a predetermined period of time during which a communication quality is below a predetermined threshold, said first station and said second station use standby values for said at least one of the communication parameters.

9. A method according to claim 1, wherein the second station imposes time windows during which pulses subsequent to a first pulse must be received.

10. A method according to claim 1, wherein said at least one of the communication parameters is changed from one pulse to a next pulse.

11. An apparatus according to claim 10, wherein said at least one of the communication parameters of the pulses is changed from one pulse to a next pulse.

12. A method according to claim 1, wherein said at least one of the communication parameters is changed from one pulse packet to a next pulse packet.

13. A method according to claim 1, wherein the first station is a master control station which transmits at least one of an absolute value of and variations in characteristics of at least one of the pulses and frequency of the transmitted signals in coded form.

14. A method according to claim 13, wherein the coded form is a compressed coded form.

15. A method according to claim 13, wherein the coded form is generated using correlation data.

16. A method according to claim 1, wherein the second station is a vehicle for launching, said method further comprising the step of:

storing values for said second table within said second table before said second station is launched.

17. A method according to claim 1, wherein the second station is a vehicle for launching, said method further comprising the step of:
    downloading values into said second table, during a flight of said second station, after said second station is launched.

18. A method according to claim 1, further comprising the steps of:
    reading said table in the first station in sequence by said first station; and
    reading said second table in sequence by said second station.

19. A method according to claim 1, further comprising the steps of:
    reading said table in said first station out of sequence by said first station; and
    reading said second table out of sequence by said second station.

20. A method according to claim 1, wherein values within said table in the first station are constant.

21. A method according to claim 1, wherein values within said table in the first station vary and are selected by a program.

22. An apparatus for frequency hopping communication, comprising:
    a first transmitter means for transmitting a frequency hopping first signal which includes pulses, from a first station to a second station;
    a second transmitter means for transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to a jamming of said first signal;
    a receiver for receiving the second signal by the second station using a second table in the second station which indicates how said at least one of the communication parameters has been changed.

23. An apparatus according to claim 22, wherein said second transmitter means changes said at least one of the communication parameters which is the pulse width.

24. An apparatus according to claim 22, wherein said second transmitter means changes said at least one of the communication parameters which is the number of pulses.

25. An apparatus according to claim 22, wherein said second transmitter means changes said at least one of the communication parameters which is the timing of the pulses.

26. An apparatus according to claim 25, wherein said second transmitter means which changes the timing of the pulses changes at least one of a repetition rate, a word length, and an interval between words and packets.

27. An apparatus according to claim 22, wherein the second station causes said at least one of the communication parameters to be changed.

28. An apparatus according to claim 22, wherein said first station comprises a means for inhibiting a transmission on a jammed frequency such that when said frequency is jammed for a predetermined period of time, said first station is inhibited from transmitting on said frequency which has been jammed.

29. An apparatus according to claim 22, wherein said first station and said second station contain erspective standby means for causing said first and second station to use standby values for said at least one of the communication parameters, after a predetermined period of time during which a communication quality is below a predetermined threshold.

30. An apparatus according to claim 22, wherein the second station imposes time windows during which pulses subsequent to a first pulse must be received.

31. An apparatus according to claim 22, wherein said at least one of the communication parameters of the pulses is changed from one pulse packet to a next pulse packet.

32. An apparatus according to claim 22, wherein the first station is a master control station which transmits at least one of an absolute value of and variations in characteristics of at least one of the pulses and frequency of the transmitted coded form.

33. An apparatus according to claim 32, wherein the coded form is a compressed coded form.

34. An apparatus according to claim 32, wherein the coded form is generated using correlation data.

35. An apparatus according to claim 22, wherein said first station comprises means for reading said table in the first station in sequence; and
    wherein said second station comprises means for reading said second table in sequence.

36. An apparatus according to claim 22, wherein said first station comprises means for reading said table in the first station out of sequence; and
    wherein said second station comprises means for reading said second table out of sequence.

37. An apparatus according to claim 22, wherein values within said table in the first station are constant.

38. An apparatus according to claim 22, wherein values within said table in the first station vary and are selected by a program.

39. An apparatus according to claim 22, wherein the second station is a vehicle for launching, and the second station comprises:
    means for storing values of said second table within said second table before said second station is launched.

40. An apparatus according to claim 22, wherein the second station is a vehicle for launching, and the second station comprises:
    means for downloading values into said second table, during a flight of said second station, after said second station is launched.

41. A method for frequency hopping communication, comprising the steps of:
    transmitting, a frequency hopping first signal which includes pulses, from a first station to a second station;
    transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to a jamming of said first signal;

receiving the second signal by the second station using a second table in the second station which indicates how said at least one of the communication parameters has been changed.

42. An apparatus for frequency hopping communication, comprising:

a first transmitter means for transmitting a frequency hopping first signal which includes pulses, from a first station to a second station;

a second transmitter means for transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to a jamming of said first signal;

a receiver for receiving the second signal by the second station using a second table in the second station which indicates how said at least one of the communication parameters has been changed.

43. A method for frequency hopping communication, comprising the steps of:

transmitting, a frequency hopping first signal which includes pulses, from a first station to a second station;

transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to an intrusion of said first signal;

receiving the second signal by the second station using a second table in the second station which indicates how said at least one of the communication parameters has been changed.

44. An apparatus for frequency hopping communication, comprising:

a first transmitter means for transmitting a frequency hopping first signal which includes pulses, from a first station to a second station;

a second transmitter means for transmitting a frequency hopping second signal from the first station to the second station, at a predetermined period of time after the transmission of the first signal, the second signal having at least one of the following communication parameters including a number of pulses, a pulse width, and a timing of pulses, which is different from the first signal, wherein said at least one of the communication parameters is changed using a table in the first station, and a changing of the communication parameters is performed in response to an intrusion of said first signal;

a receiver for receiving the second signal by the second station using a second table in the second station which indicates how said at least one of the communication parameters has been changed.

* * * * *